United States Patent [19]

Sakuragi

[11] Patent Number: 5,128,763

[45] Date of Patent: Jul. 7, 1992

[54] INK SHEET CASSETTE AND RECORDING APPARATUS CAPABLE OF MOUNTING THE CASSETTE

[75] Inventor: Kenkichi Sakuragi, Tokyo, Japan

[73] Assignee: Canon Kabushiki Kaisha, Tokyo, Japan

[21] Appl. No.: 762,742

[22] Filed: Sep. 18, 1991

Related U.S. Application Data

[60] Continuation of Ser. No. 450,163, Dec. 13, 1989, abandoned, which is a division of Ser. No. 282,893, Dec. 12, 1988, Pat. No. 4,910,602, which is a continuation of Ser. No. 83,002, Aug. 7, 1987, abandoned, which is a continuation of Ser. No. 741,734, Jun. 5, 1985, abandoned.

[30] Foreign Application Priority Data

| Jun. 12, 1984 | [JP] | Japan | 59-119142 |
| Jun. 26, 1984 | [JP] | Japan | 59-130133 |
| Jul. 4, 1984 | [JP] | Japan | 59-137347 |
| Jul. 4, 1984 | [JP] | Japan | 59-137348 |
| Jul. 4, 1984 | [JP] | Japan | 59-137349 |

[51] Int. Cl.⁵ .............. H04N 1/23; B41J 2/325; B41J 17/32; B41J 32/00
[52] U.S. Cl. ............. 358/296; 346/76 PH; 400/208; 400/246
[58] Field of Search ........... 346/76 PH; 400/120, 400/207, 208, 246; 358/296

[56] References Cited

U.S. PATENT DOCUMENTS

| 3,701,318 | 10/1972 | Lozeau | 400/246 |
| 3,774,538 | 11/1973 | Bullock | 400/208 |
| 4,160,605 | 7/1979 | Neubaum | 400/208 |
| 4,534,666 | 8/1985 | Watanabe | 400/207 |

*Primary Examiner*—Benjamin R. Fuller
*Assistant Examiner*—Scott A. Rogers
*Attorney, Agent, or Firm*—Fitzpatrick, Cella, Harper & Scinto

[57] ABSTRACT

An ink sheet cassette mountable on a recording apparatus includes a frame member, an ink sheet having ink thereon, a first winding member capable of winding the ink sheet, and a second winding member also capable of winding the ink sheet. A first support member supports the first winding member on the frame member, and is capable of contacting a member provided on the recording apparatus when the ink sheet cassette is mounted thereto. A second support member is provided for supporting the first winding member on the frame member, and is capable of contacting another member provided on the recording apparatus when the ink sheet cassette is mounted thereto.

7 Claims, 13 Drawing Sheets

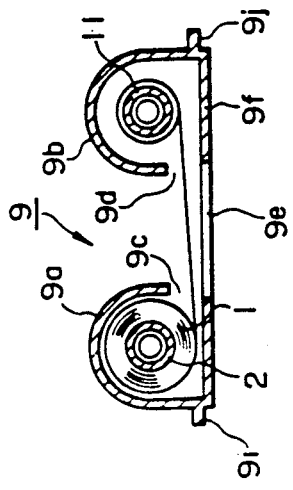
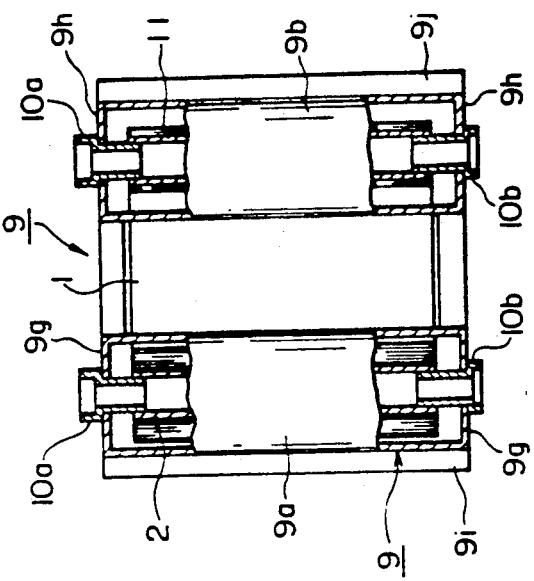
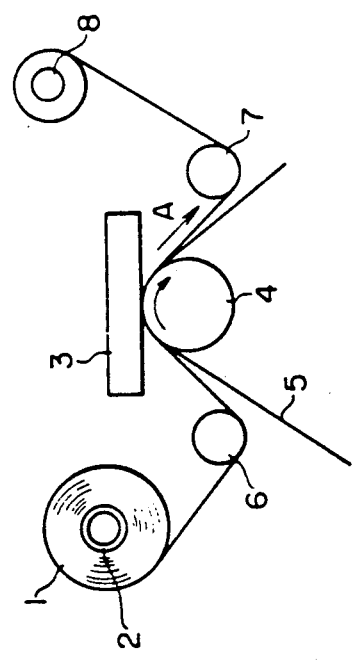
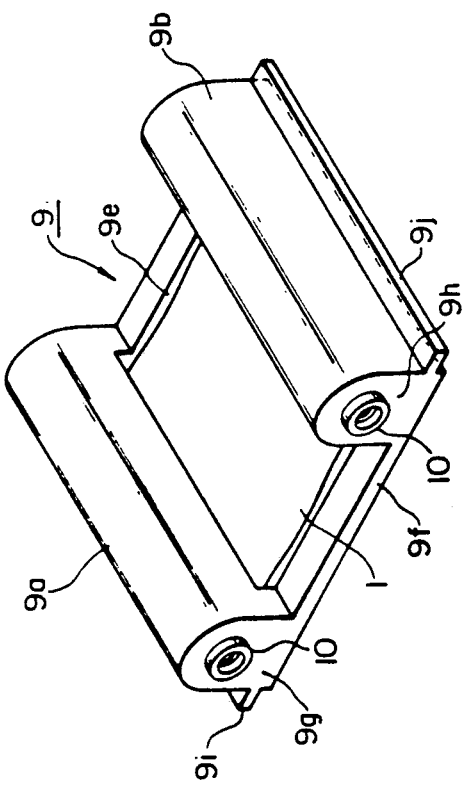

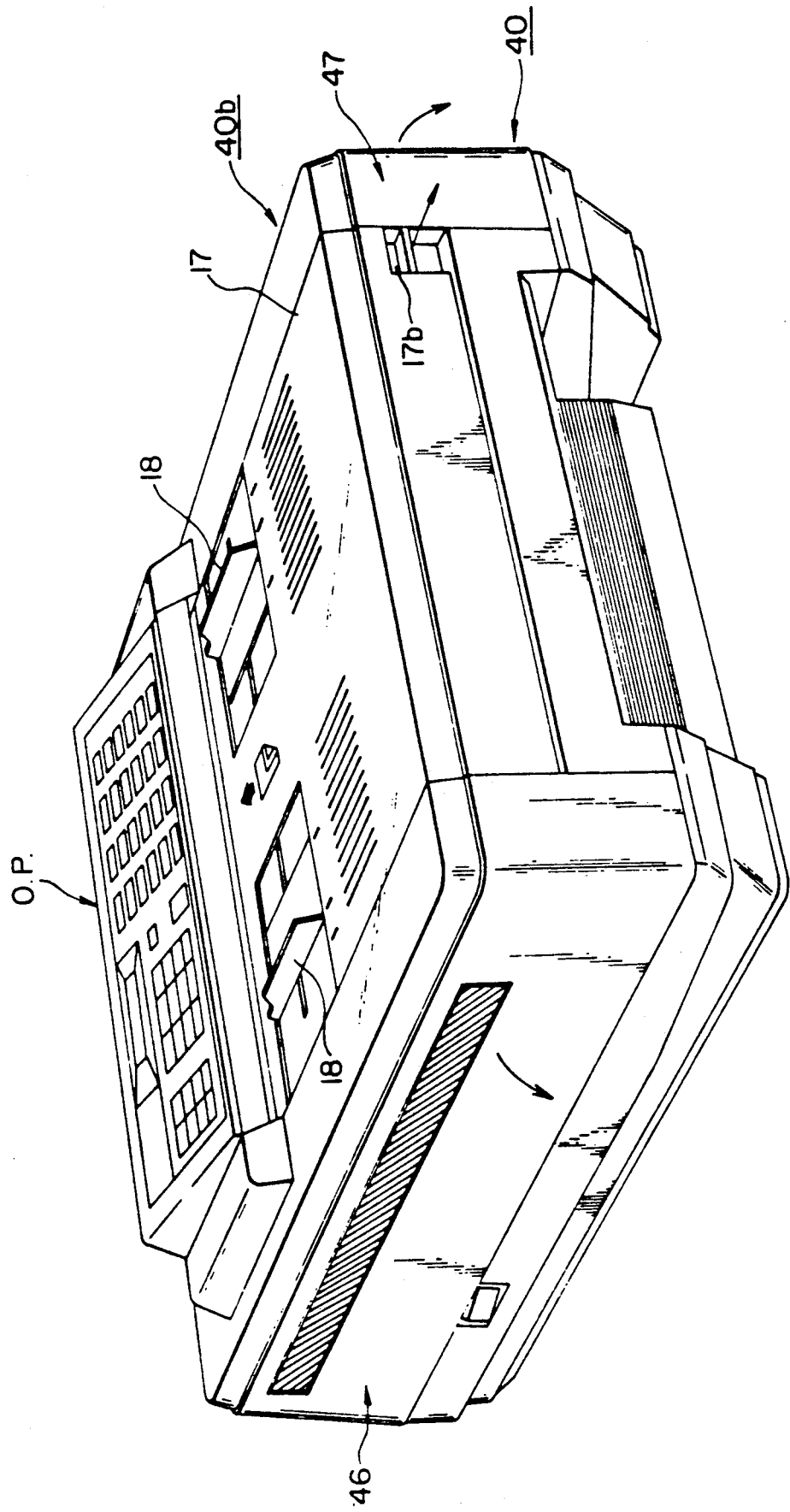

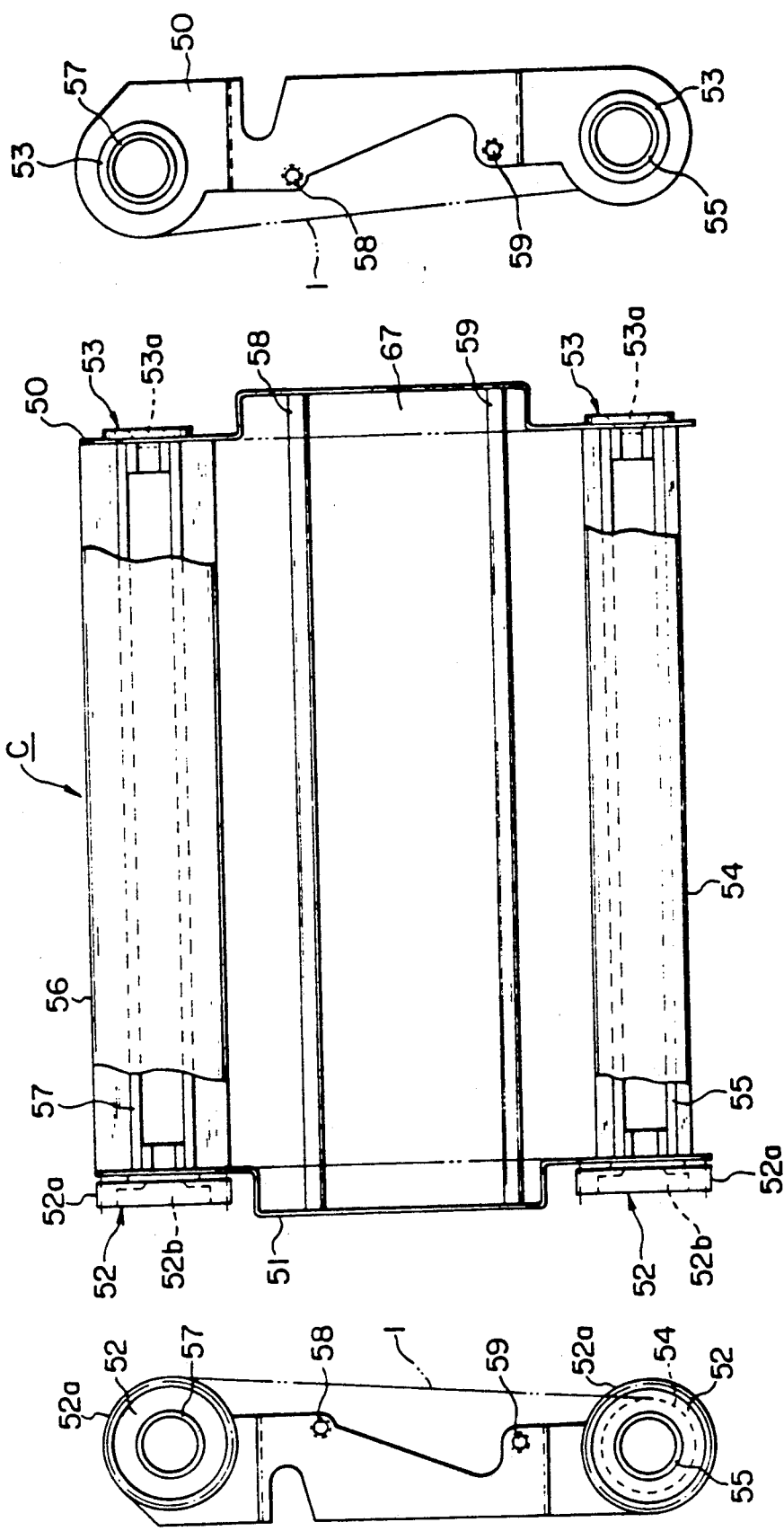

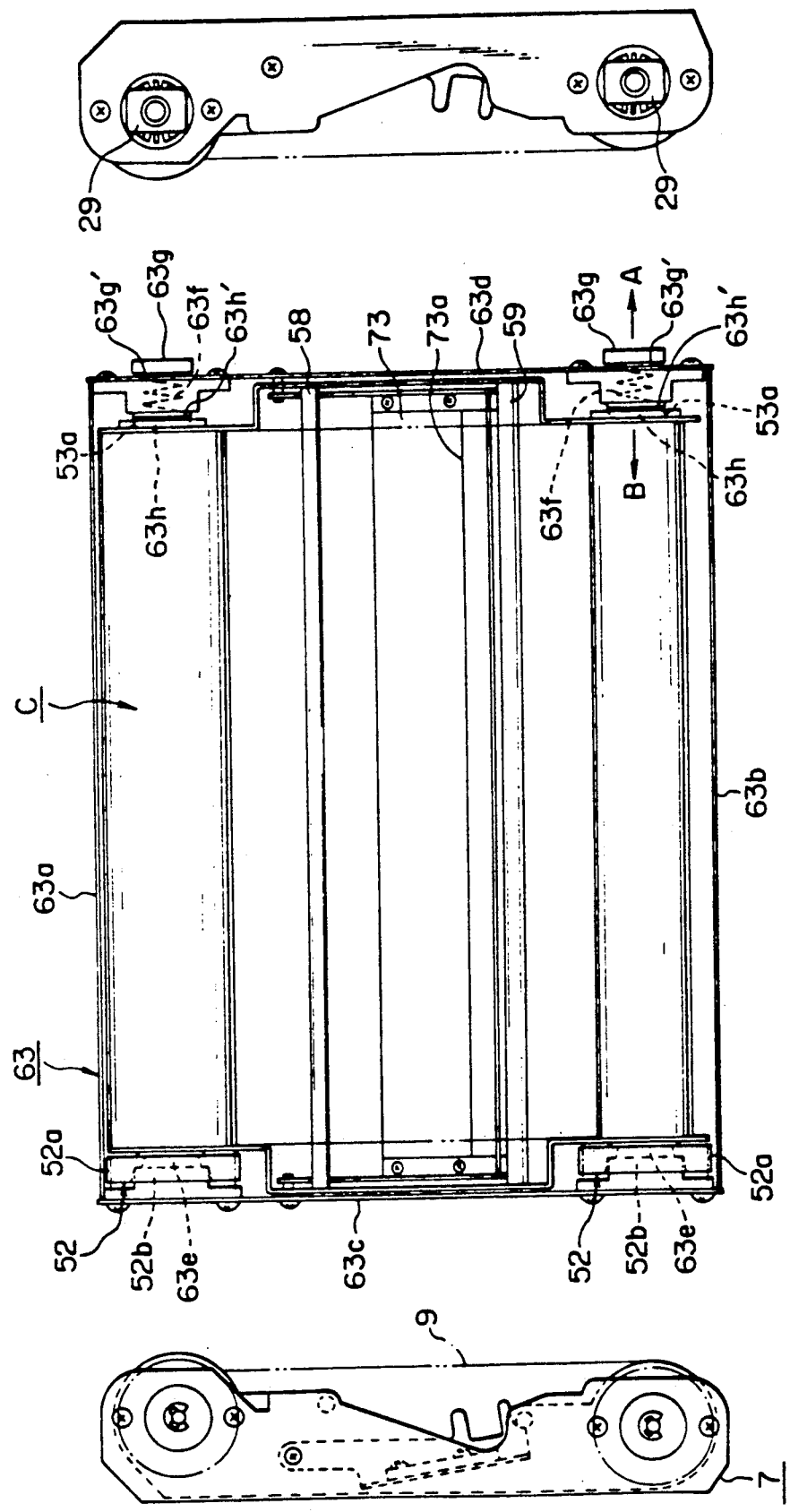

INK SHEET CASSETTE AND RECORDING APPARATUS CAPABLE OF MOUNTING THE CASSETTE

This application is a continuation of application Ser. No. 07/450,163 filed Dec. 13, 1989, now abandoned, which is a division of application Ser. No. 07/282,893 filed Dec. 12, 1988, now U.S. Pat. No. 4,910,602, which is a continuation of application Ser. No. 07/083,002 filed Aug. 7, 1987, now abandoned, which is a continuation of application Ser. No. 07/741,734 filed Jun. 5, 1985, now abandoned.

BACKGROUND OF THE INVENTION

1. Field of the Invention

This invention relates to a recording apparatus which uses an ink sheet carrying thereon ink which is transferred to a recording sheet in response to an information signal, thereby recording on the recording sheet an image corresponding to the information signal, and to a cassette for corsing the ink sheets. The recording apparatus includes. for example, a so-called facsimile apparatus, an electronic typewriter (ETW), a printer or a word processor.

2. Description of the Prior Art

A description will hereinafter be given of a facsimile apparatus taken as an example of the recording apparatus.

An example of the conventional facsimile apparatus is shown in FIG. 1 of the accompanying drawings.

In the conventional facsimile apparatus, a roll of ink sheet wound on a core 2, as shown in FIG. 1, has generally been used as an ink sheet 1 superposed on recording paper 5. The ink sheet 1 unwound from the roll is directed between a thermal head 3 and a platen roller 4 via a tension roller 6 and is taken up by a take-up shaft 8 via a further tension roller 7. On the other hand, the recording paper 5 is directed between the thermal head 3 and the platen roller 4 so as to be superposed under the ink sheet 1. In this manner, recording by heat transfer is effected with the ink sheet 1 and the recording paper 5 being conveyed while being nipped between the thermal head 3 and the platen roller 4.

Thus. where such a structure is adopted, the user of the apparatus must pass the rolled ink sheet 1 through a narrow space in which various members are disposed proximate to one another, as shown in FIG. 1, and the mounting of the ink sheet requires a very cumbersome operation.

So, as described in Japanese Laid-open Utility Model Application No. 26360/1984 (filed in Japan on Aug. 12, 1982 and laid open on Feb. 18, 1984), there is known a heat transfer printing apparatus in which an upper frame is pivoted upwardly and then a transfer ribbon roll is set on a lower frame and the transfer ribbon is placed, so as to extend from the transfer ribbon roll onto a guide rail, a thermal head and a transfer ribbon feeding roller, whereafter the upper frame and the lower frame are closed together.

In this apparatus, however, the transfer ribbon is in the form of a roll and moreover, this roll of transfer ribbon is provided on the lower frame 1 and thus, it has been necessary to mount and dismount the roll of transfer ribbon with respect to the lower frame. Moreover, the transfer ribbon must be mounted to the body while creeping or rubbing on the thermal head 1 and therefore, it has been necessary to take care so that the transfer ribbon is not damaged or the thermal head is not stained when the transfer ribbon is mounted.

SUMMARY OF THE INVENTION

It is an object of the present invention to provide a recording apparatus which readily permits the mounting and dismounting of an ink sheet to be accomplished.

It is another object of the present invention to provide a recording apparatus in which an ink sheet is not wrinkled or damaged when it is mounted onto the body of the apparatus.

It is still another object of the present invention to provide a recording apparatus which readily permits the mounting and dismounting of an ink sheet cassette integrally having an ink sheet carrying thereon ink to be transferred and a support member for supporting the ink sheet.

It is yet another object of the present invention to provide a recording apparatus which readily permits the mounting and dismounting of an ink sheet cassette or the treatment of a jam of a recording sheet, and maintenance such as repair, to be accomplished.

BRIEF DESCRIPTION OF THE DRAWINGS

FIG. 1 is a schematic view of the facsimile apparatus according to the prior art.

FIG. 2(A) is a perspective view of an embodiment of the ink sheet cassette applicable to the present invention.

FIG. 2(B) is a side cross-sectional view thereof.

FIG. 2(C) is a front cross-sectional view thereof.

FIG. 5 is a pictorial perspective view of the apparatus.

FIG. 6(A) is a left side view of another embodiment of the ink sheet cassette.

FIG. 6(B) is a plan view thereof.

FIG. 6(C) is a right side view thereof.

FIG. 10(A) is a left side view of the cassette loading portion as it is loaded with the cassette.

FIG. 10(B) is a plan view thereof.

FIG. 10(C) is a right side view thereof.

DESCRIPTION OF THE PREFERRED EMBODIMENTS

Figure 3:
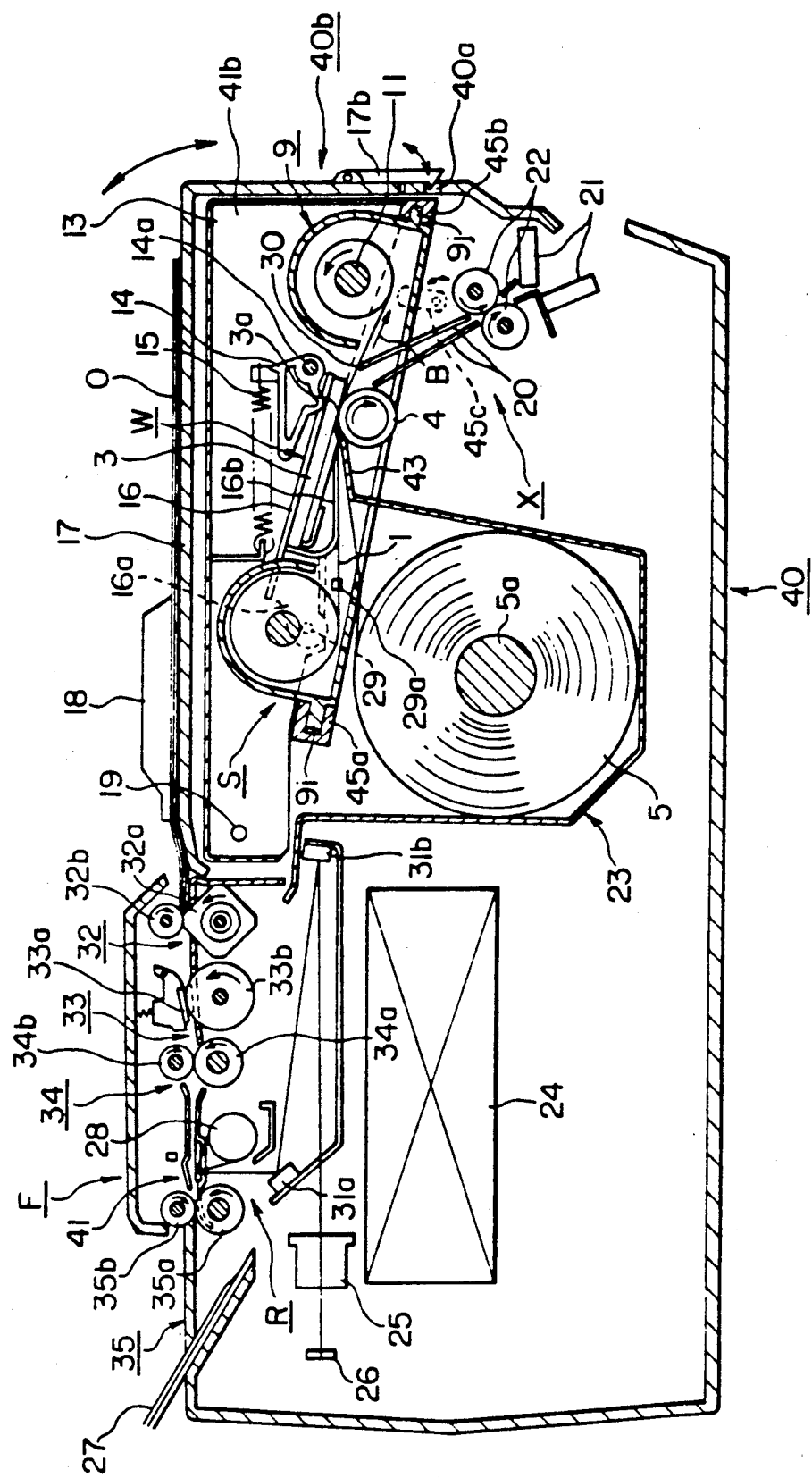
FIG. 3 is a cross-sectional view showing a state in which a facsimile apparatus with an ink sheet cassette mounted therein is closed.

An example of an ink sheet cassette usable in a facsimile apparatus to which an embodiment of the present invention is applied will first be described. FIG. 2(A) is a perspective view of the ink sheet cassette, FIG. 2(B) is a side cross-sectional view thereof and FIG. 2(C) is a front cross-sectional view thereof.

Referring to these Figures, the ink sheet cassette 9 is formed of synthetic resin integrally molded, and bulged portions 9a and 9b of arcuate cross-section for mounting an ink sheet 1 thereon are provided on the opposite ends of a base plate 9f. Cut-away portions 9c and 9d are provided in the lower portions of the inner side walls of these bulged portions 9a and 9b so as to form a path for the ink sheet 1 mounted between the bulged portions 9a and 9b. An opening 9e is provided in the base plate 9f between the bulged portions 9a and 9b so as to enable a recording head to press the ink sheet 1 and a recording sheet in superposed relation with each other between it and a platen roller as will hereinafter be described.

Spindles 10a, 10b are rotatably supported on the lengthwisely opposite side plates 9g of one bulged portion 9a, and a supply shaft 2 on which an unused ink sheet is wound is held by these spindles 10a, 10b. Also, spindles 10a, 10b are rotatably supported on the lengthwisely opposite side plates 9h of the other bulged portion 9b, and a take-up shaft 11 for taking up the used ink sheet is held between these spindles. The ink sheet 1 wound in the form of a roll on the supply shaft 2 is directed out of the cut-away portion 9c of the bulged portion 9a and passes through the cut-away portion 9d after the ink carried thereon has been transferred to the recording sheet, and is wound on the take-up shaft 11. The ink sheet 1 is of a width sufficient to overlap the full width of a sheet for recording images thereon.

By the ink sheet cassette 9 being removably mounted at a predetermined position in the facsimile apparatus, the supply shaft 2 and the take-up shaft 11 are rotatively driven from the body side and the ink sheet 1 contained therein is paid away from the supply shaft 2 and taken up onto the take-up shaft 11.

Rails 9i and 9j are provided on the other walls of the bulged portions 9a and 9b along the lengthwise direction thereof and, by these rails 9i and 9j sliding on a substantially U-shaped rail on the body side, the ink sheet cassette 9 can be removably mounted in the body.

Figure 4:
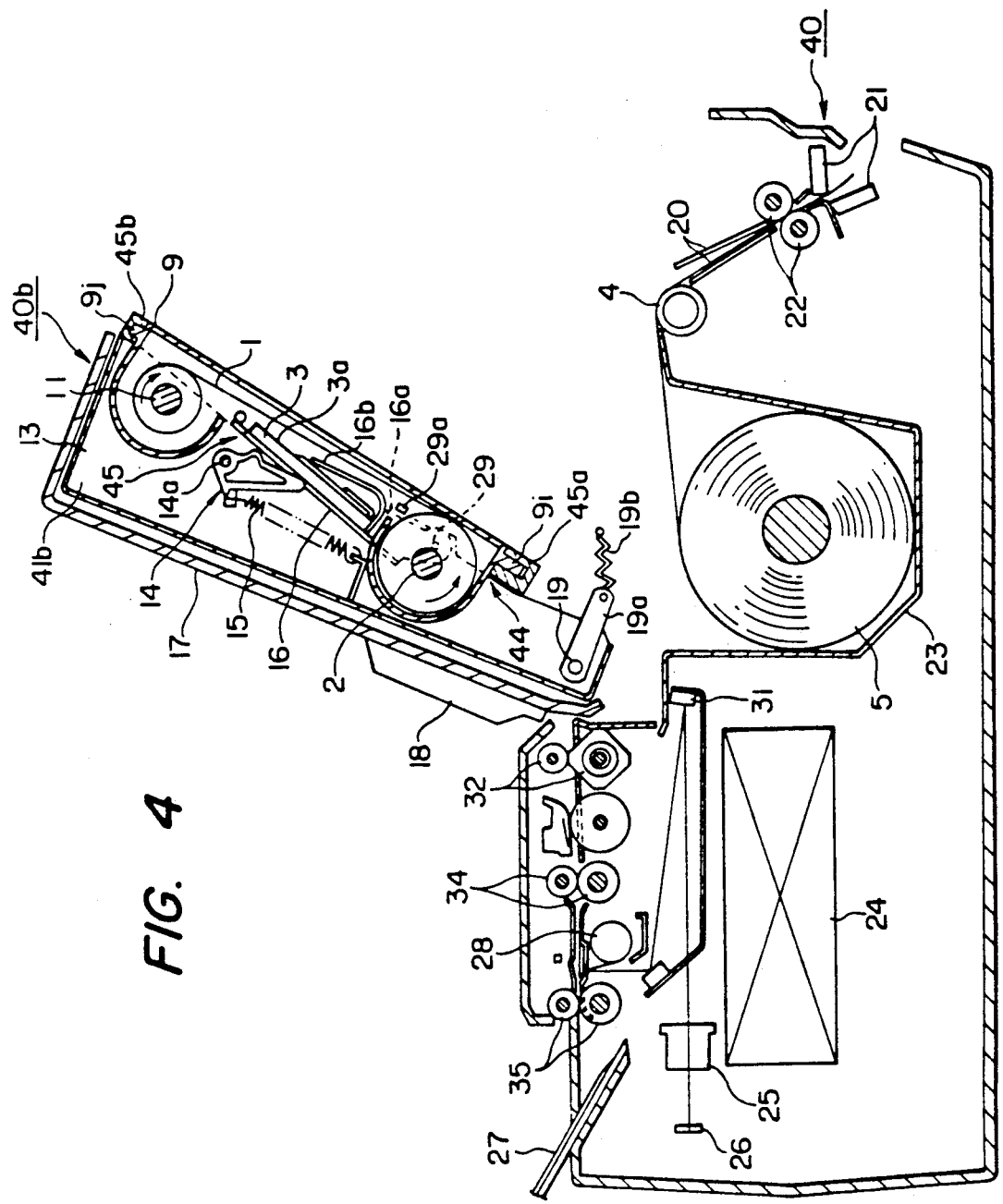
FIG. 4 is a cross-sectional view showing a state in which the apparatus is opened.

A description will now be given of an example of the facsimile apparatus in which the ink sheet cassette 9 has been mounted. FIG. 3 is a cross-sectional view showing the apparatus in its closed state, FIG. 4 is a cross-sectional view showing the apparatus in its opened state, and FIG. 5 is a perspective view showing the appearance of the apparatus.

In the present embodiment, a reading mechanism R for reading the image of an original, an automatic original conveying mechanism F for conveying the original, a recording sheet loading portion 23 and a recording sheet conveying mechanism X are provided in a main housing 40. A recording mechanism W for recording on a recording sheet an image corresponding to the information is provided in an upper housing 40b pivotable upwardly about a shaft 19 relative to the main housing 40 and having an original carriage cover 17.

The reading mechanism R provided in the main housing 40 will first be described in connection with the original carriage cover 17. First, the conveying mechanism for conveying the original to a reading unit will be explained. The original carriage cover 17 can be opened by being upwardly pivoted about the shaft 19 relative to the main housing 40 and is provided upstream of the reading mechanism R with respect to the direction of conveyance of the original. The original O is placed on the cover 17 with the surface of the original to be read facing downward. At this time, the original may be placed on the cover 17 along an original width guide provided on the cover 17 and movable in conformity with the width of the original. Then, the original O placed on the cover 17 is automatically brought to a reading unit 41 by an automatic original supplying device F comprising a feeder section 32, a separating section 33, a conveying section 34 and a discharging section 35, and is discharged onto an original tray 27 after the surface of the original is read. The feeder section 32 comprises a square roller 32a and a pressure contact roller 32b, and the roller 32a is rotated (in the direction of arrow) to thereby squeeze the bundle of originals and make the originals ready to be separated one by one and deliver the originals to the separating section 33 one by one. The originals having arrived at the separating section 33 are separated one by one by the cooperation between a friction piece 33a and a roller 33b (rotatable in the direction of the arrow). The original thus separated is then nipped between conveying rollers 34a and 34b and is further conveyed thereby and passes through an exposure station as the reading unit 41 which will be described later, whereafter it is discharged onto the original tray 27 (partly shown) by a pair of discharge rollers 35a and 35.

Now, the original O conveyed by the automatic original supplying device F is read by the image thereof being illuminated by a light source 28 at the exposure station 41 between the conveying section 34 and the discharging section 35 and the reflected light thereof being condensed by a lens 25 through mirrors 31a and 31b and imaged on a reading element 26 such as a CCD. The image of this reflected light imaged on the reading element 26 is converted into an information signal by conventional means. This information signal is transmitted to a recording unit provided in the same apparatus or in another apparatus and records the image on a recording sheet 5.

The loading portion 23 for the roll of recording sheet 5 and the recording sheet conveying mechanism X are further provided in the main housing 40.

The loading portion 23 is in the form of a tub having a size sufficient to contain therein a roll of unused recording sheet 5 having a given maximum diameter and is provided below the original carriage cover 17. Also, mounting means (not shown) for removably positioning and mounting a core 5a on which the roll of recording sheet 5 is wound are provided on the opposite side plates (not shown) of the loading portion 23. Further, at the outlet side of this loading portion 23, there are provided a guide 43 for guiding the sheet 5, a platen roller 4 for guiding the sheet 5 while being rotatively driven, a guide 20 and a pair of conveying rollers 22, and these constitute the sheet conveying mechanism X. The platen roller 4 is made of rubber and serves to hold the ink sheet 1 and the recording sheet 5 pressed by the recording head 3 which will later be described. By the operation of the recording head 3 conforming to the information signal, a heat-generating element 3a generates heat and the ink carried on the ink sheet 1 is melted and transferred onto the recording sheet 5 and thus, the image is recorded on the sheet 5.

Reference numeral 21 designates cutters for cutting the recording sheet 5 at a desired position. Reference numeral 24 denotes a power source device.

The image recording mechanism W will now be described.

In the present embodiment, the loading portion 44 of the ink sheet cassette 9 constituting the image recording mechanism W and the recording head 3 are provided in an upper housing 41b having the original carriage cover 17 in the upper portion thereof.

A mechanism for opening and closing the upper housing 41b having the original carriage cover 17 will first be described.

In the present embodiment, the housing 41b having the cover 17 is upwardly pivotable about the shaft 19 provided downstream with respect to the direction of conveyance of the original. A lever 19a is secured to one end of this shaft 19, and the other end of the lever 19a is pulled by a spring 19b. Also, a locking lever 17b is provided on the housing 41b which is adjacent to the cover 17, and the tip end of this lever 17b is engaged with the groove portion 40a of the main housing 40, whereby the cover 17 maintains its closed state in which image recording is possible (FIG. 3), against the resilient force of a spring 19b. If this lever 17b is pivoted counter-clockwise to release its engagement with the groove portion 40a, the cover 17 will be pivoted upwardly by the resilient force of the spring 19b and maintain its opened state in a position in which the moment is balanced (FIG. 4).

A description will now be given of the loading portion 45 of the ink sheet cassette 9 provided on the cover 17 and the recording head 3.

The loading portion 45 is provided on an upper base 13 fixed to the inner side of the cover 17 and has a sufficient space for mounting the cassette 9 therein from the innermost side plate 17a to this side, and substantially U-shaped rails 45a and 45b extending from the innermost side to this side are secured to the opposite ends thereof. Therefore, if the rails 9i and 9j of the cassette 9 slide on these rails 45a and 45b, the cassette 9 an be mounted on the loading portion 45 and can be removed from the loading portion 45. The cassette 9 mounted in the loading portion 45 is positioned and locked on the loading portion 45 by counter-clockwisely pivoting a lever 45c (indicated by dots-and-dash line) provided on this side of the loading portion 45. Also, by clockwisely pivoting the lever 45c and retracting it from the mounting-dismounting path of the cassette 9, the cassette 9 can be drawn out from the loading portion 45 in the thrust direction (toward this side).

The recording head 3 will now be described.

The recording head 3 has a heat-generating element 3a linearly embedded therein at a location opposed to the platen roller 4, the heat-generating element 3a being adapted to generate heat in response to the information signal. This recording head 3 is provided on the upper base 13 side above the loading portion 45 for pivotal movement about a shaft 29 through an arm 16a supporting a head holder 16 and provided outside the innermost part of the loading portion 45. Reference numeral 29a designates a stopper for controlling the downward pivotal movement of the arm 16a. Thus, in the opened state of the body, the ink sheet 1 in the ink sheet cassette 9 loaded into the ink sheet cassette loading portion 45 and the recording head 3 become spaced apart from each other.

Also, a head press arm 14 is pivotally mounted on the upper surface of the free end of the head holder 16 through a shaft 14a, and a spring 15 is extended between this head press arm 14 and the fixed portion of the apparatus. Thus, the head press arm 14 is biased counter-clockwise as viewed in FIG. 3 to impart to the thermal head 3 a pressure force which brings the head 3 into contact with the platen roller 4. Describing the widths of the linear heat-generating element 3a, the ink sheet 1 and the recording sheet 5, the linear heat-generating element 3a and the sheet 5 are of substantially the same width, and the sheet 1 has a greater width (usually 2-6 mm) than the sheet 5.

Designated by 16b is a paper guide curvedly provided below the thermal head 3 to guide the sheet 5 to the heat-generating element 3a of the thermal head 3.

A description will now be given of the operation of mounting and dismounting the ink sheet cassette 9 and the recording sheet 5 with respect to the body in the above-described construction.

A method of loading the ink sheet cassette 9 and the recording sheet 5 into the body will first be described.

First, the front door 46 and the rear door 47 of the body are opened by pivoting them about hinges, not shown, in the directions of the respective arrows indicated in FIG. 5. Subsequently, the locking lever 17b is released from the groove portion 40a and the cover 17 is opened upwardly by the resilient force of the spring 19b. The rails 9i and 9j of the cassette are then slid on the rails 45a and 45b of the body and the cassette 9 is pushed in the thrust direction. If, during this setting work, the operator only raises the thermal head 3 through the head holder 16, the portion below the loading portion 45 will provide a large space and will become greatly spaced apart from the conveyance path of the recording sheet 5 or from the platen roller 4, thus permitting the cassette 9 to be mounted without damaging the ink sheet 1. After being mounted in the loading portion 45, the cassette 9 may be locked on the loading portion if the lever 45c is pivoted counter-clockwise (the position shown in FIG. 3). Thereafter, if the cover 17 (the upper housing 40b) is pivoted downwardly and the lever 17b is restrained in the groove portion 40a, the cover 17 (the upper housing 40b) will be closed relative to the main housing 40 and the body will become operative. Thereupon, the platen roller 4 comes into the cassette 9 through an opening 9e in the cassette 9 mounted in the loading portion 45, and the recording sheet 5 on the main housing 40 side and the ink sheet 1 contained in the cassette 9 are superposed one upon the other over the full width thereof and become urged against the recording head 3. That is, the ink sheet 1 is superposed on the recording sheet 5 between the recording head 3 and the platen roller 4 and, as shown in FIG. 3, the ink sheet 1 and the recording sheet 5 are bent in the form of a mountain with their portions in contact with the platen roller 4 as the vertex and are set with the slack of the ink sheet 1 being removed. The roll of recording sheet 5 is dropped into the loading portion 23, whereafter it is directed between the platen roller 4 and the guide 20, between the rollers 22 and between the cutters 21.

The recording head 3 urges the ink sheet 1 and the recording sheet 5 against the platen roller 4 from between the bulged portions 9a and 9b with the aid of the resilient force of the spring 15.

When the apparatus is started, the take-up shaft 11, the platen roller 4, the pair of paper discharge rollers 22, etc. become ready to be driven by a driving system (not shown) and reading of the original is initiated.

The heat-generating element 3a of the recording head 3 generates heat in accordance with the reading signal and the ink carried on the ink sheet 1 is transfereed onto the recording sheet 5 and thus, recording is effected.

The ink sheet 1 and the recording sheet 5 which have completed the recording are separated from each other by the separating section 30 at one end of the guide plate 20, and the ink sheet 1 is taken up onto the take-up shaft 11. The recording sheet 5 passes between the guide plates 20 and 20 and is discharge by the pair of paper discharges rollers 22 and 22 and after the recording has all been terminated, the recording sheet 5 is cut by the cutters 21 and 21 and discharged outwardly of the apparatus.

During the interchange of the recording sheet 5 or the cassette 9, as shown in FIG. 4, the upper base 13 constituting the upper housing 40b is pivoted counterclockwise about the shaft 19 with the original carriage cover 17.

Thereupon, the cassette 9 also separates from the platen roller 4, and the recording sheet 5 and the ink sheet 1 become greatly spaced apart from each other. At this time, the rails 45a and 45b maintain the mounted state of the ink sheet cassette 9 onto the loading portion 45 against the gravity of the ink sheet cassette 9.

So, the lever 45c is pivoted clockwise to release its locking state, whereafter the cassette 9 is slid on the rails 45a and 45b and is drawn out in the thrust direction, whereby the cassette 9 can be simply removed from the loading portion 45. If, during this removing work of the cassette 9, the thermal head 3 is only raised as during the setting work, the removing work will progress smoothly. Also, the roll of recording sheet 5 may be taken out of the loading portion 23. In FIG. 5, letters O.P. designate an operating panel.

Another embodiment will now be described.

This embodiment relates to an ink sheet cassette removably mountable in directions (the directions of arrows X and Y in FIG. 9) perpendicular to the thrust direction, and to a facsimile apparatus with respect to which the cassette is removably mountable.

Figure 7:
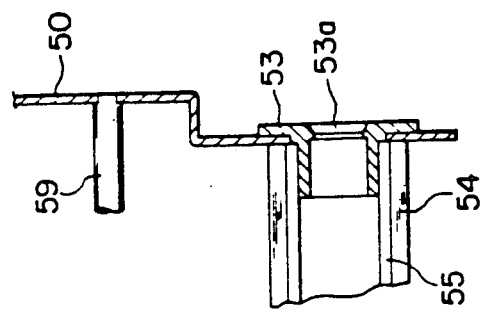
FIG. 7 is a fragmentary cross-sectional view thereof.

The ink sheet cassette will first be described with reference to FIGS. 6(A), (B) and (C) and FIG. 7. FIG. 6 (A) is a left side view of the cassette of the present embodiment, FIG. 6 (B) is a plan view thereof, FIG. 6 (C) is a right side view thereof, and FIG. 7 is a fragmentary cross-sectional view thereof.

In these Figures, reference numerals 50 and 51 designate cassette side plates. Support shafts 52 and 53 are forced from the outside of these side plates 50 and 51 into the core 55 of a roll 54 on which an ink sheet to be supplied is wound and the core 57 of a roll 56 on which the ink sheet after being used is taken up. The take-up ink sheet roll 56 and the supply ink sheet roll 54 are rotatably mounted in the cassette C. A gear 52a is provided on the peripheral surface of each support shaft 52 and is adapted to mesh with the driving system on the body side when the cassette C is mounted in the body, thereby rotating the rolls 54 and 56. Thus, the ink sheet 1 is taken up from the supply ink sheet roll 54 onto the take-up ink sheet roll 56.

Further, in this cassette C, a separating roller 58 and a guide shaft 59 are rotatably mounted between the side plates 50 and 51. The separating roller 58 serves to separate the ink sheet 1 and the recording sheet 5 from each other after transfer, and the guide shaft 59 serves to guide the ink sheet 1 to the transfer station. The upper and lower portions of the cassette C are open to permit the entry of the recording head thereinto.

Tapered recesses 52b and 52a are provided in the central portions of the support shafts 52 and 53, respectively. These recesses 52b and 53a, as will later be described, fit to the recesses of the body and removably restrain the cassette C when the cassette C is mounted on the loading portion of the body.

A description will now be given of a facsimile apparatus into which the cassette C may be removably loaded.

Figure 9:
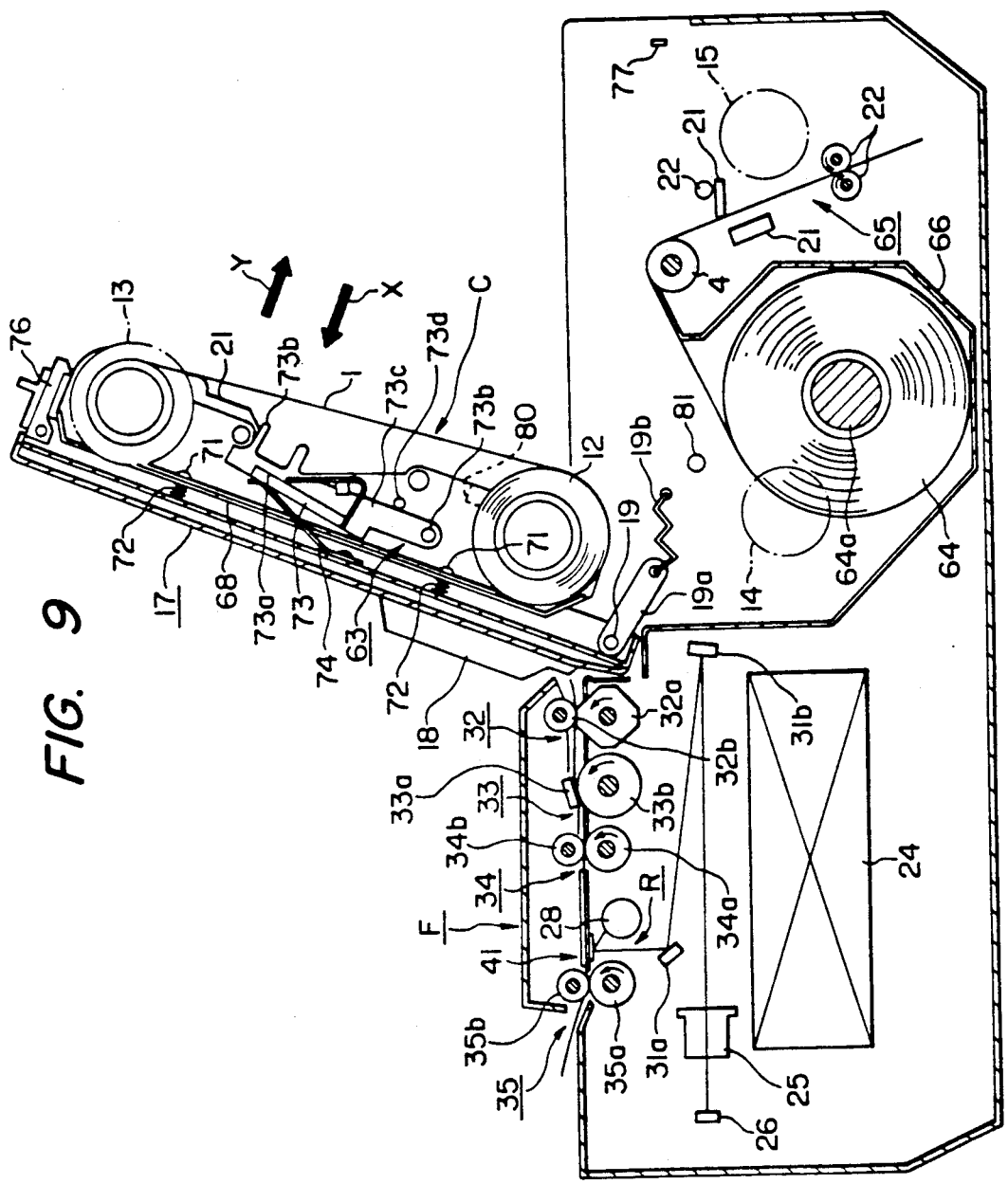
FIG. 9 is a cross-sectional view of the facsimile apparatus of FIG. 8 in its opened state.
Figure 8:
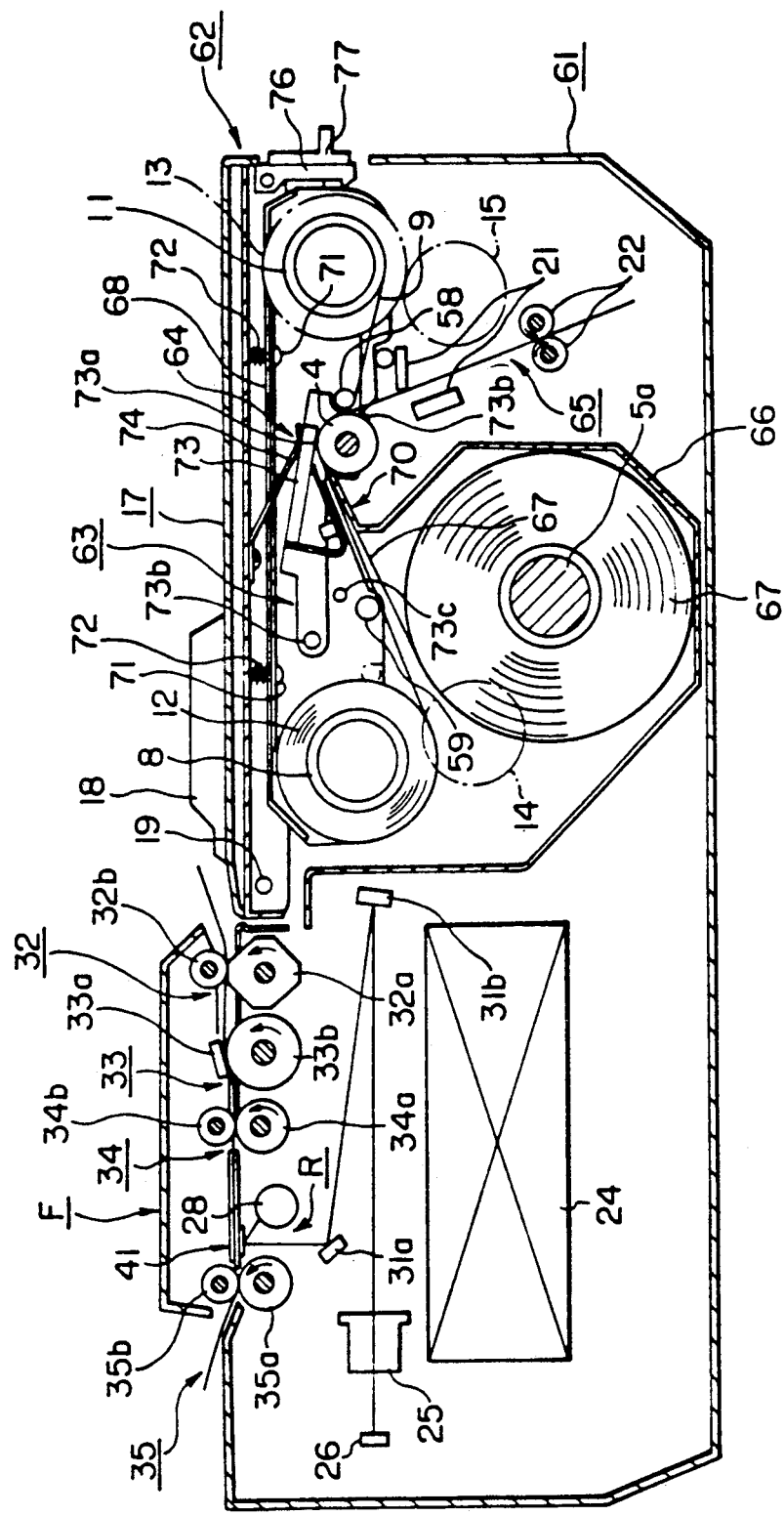
FIG. 8 is a cross-sectional view of a facsimile apparatus utilizing the ink sheet cassette of FIGS. 6(A)–6(C) and 7.

FIG. 8 is a cross-sectional view of the facsimile apparatus, FIG. 9 is a cross-sectional view of the facsimile apparatus in its open state, FIG. 10(A) is a left side view of the cassette loading portion loaded with a cassette, FIG. 10 (B) is a plan view thereof, and FIG. 10 (C) is a right side view thereof. In these figures, members similar to those in the previous embodiment are given similar reference numerals and need not be described. The appearance of this apparatus is substantially the same as that of the embodiment shown in FIG. 5.

FIGS. 8 and 9 generally illustrate the entire apparatus. A recording material conveying system 65 is contained in a lower frame member 61, and an ink sheet cassette loading portion 63, a recording portion 64 and an original carriage cover 17 are contained in an upper frame member 62. The recording material conveying system 65 guides and conveys a recording material (such as paper or plastic sheet) 67 loaded on a recording material holder 66 by a platen roller 4, records a predetermined image on the recording material at the recording portion 64, cuts the recording material by cutters 21 and discharges the recording material outwardly of the apparatus by a pair of paper discharge rollers 22. The ink sheet cassette loading portion 63 is provided in an ink sheet frame 68 formed integrally with the original carriage cover 17, and is designed such that when the cassette C is loaded, the ink sheet 1 wound on an ink sheet supply side core 55 is conveyed in intimate contact with the recording material 67 at the recording portion 64, is separated from the recording material 67 by a separating roller 58 and is taken up onto a take-up side core 57. Support shaft gears 52a are mounted on the supply side core 55 and take-up side core 57 of the ink sheet conveying system 70, and these gears 52a may mesh with a supply gear and a take-up gear, respectively, mounted in the lower frame member 61, whereby the drive force of a motor may be transmitted to the cores 55 and 57. The ink sheet frame 68 in which the cassestte loading portion 63 is provided is mounted on a support bar 71 projectedly provided on the surface of the ceiling of the upper frame member 62, through a spring 72.

Furthermore, in the upper frame member 62, a thermal recording head 73 for heating the ink sheet 1 in response to an information signal is mounted above the cassette loading portion 63 for pivotal movement about a shaft 73b, the this head 73 can urge the recording material 67 and the ink sheet 1 against the platen roller 4 with the aid of a pressing spring 74, and this constitutes the recording portion 64. Designated by 73a is a heat-generating element provided in the form of a line, and denoted by 73c is a heat holder for holding the head 73.

The upper frame member 62 is pivotally connected to the lower frame member 61 by a support shaft 19, the upper frame member 62 is mounted so as to be openable about the support shaft 19, and the upper frame member 62 and the lower frame member 61 are closed by the engagement between the hook 76 of the upper frame member 62 and the projected member 77 of the lower frame member 61. Several cut-aways 80 are formed at predetermined locations in the lower end of the ink sheet frame 68 mounted on the upper frame member 62, and positioning pins 81 are provided on the lower frame member 61 at locations corresponding to said cut-aways 80 and are adapted to fit into the cut-aways 80 to thereby accomplish the positioning of the cassette C relative to the lower frame member 61 when the upper frame member 62 is mounted on the lower frame member 61. Also, the positioning of the recording head 73 relative to the platen roller 4 is accomplished by the leg 73e of the recording head fitting to the end shaft (not shown) of the platen roller 4.

In FIG. 8, reference numeral 41 designates an original reading station. The information read at this station is converted into electrical information by a photoelectric conversion element 26, and this information is transmitted to the thermal recording head 73 of another facsimile recording apparatus or an apparatus in the same body.

A description will now be given of a case where the recording material 67 or the ink sheet cassette c is interchanged in the above-described apparatus.

When the upper frame member 62 is opened about the support shaft 19 as shown in FIG. 9, the recording material conveying system 65 and the ink sheet cassette C are spaced apart from each other to provide a wide space above the recording material holder 66 because the ink sheet cassette loading portion 63 is mounted on the upper frame member 62 which is integral with the original carriage cover 17, whereby the recording material 67 or the ink sheet cassette C can be easily interchanged. At this time, a head holder 73c has its downward pivotal movement controlled by a stopper 73d and the head 73 maintains its spaced apart state with respect to the ink sheet 1 in the ink sheet cassette C loaded on the ink sheet cassette loading portion 63. The mounting and dismounting of the cassette C will be described in detail later.

When the upper frame member 62 is to be mounted, if it is closed about the support shaft 19, the hook 76 comes into engagement with the projected member 77, whereby the two frame members 61 and 62 are fixed and the ink sheet frame 68 is automatically positioned with the positioning pins 81 of the lower frame member 61 being fitted in the cut-aways 80. Thus, the mesh engagement of the support shaft gear 52a of the ink sheet cassette C with the supply gear and take-up gear on the lower frame member 61 side is secured.

Even if, at this time, the mesh engagement of the support shaft gear 52a with the supply gear and take-up gear is incomplete, the displacement of ink sheet frame 68 will be absorbed by the spring 72 because the ink sheet frame 68 is held by the spring 72. If, in this state, the apparatus is driven, the supply gear or the take-up gear to which the drive force has been transmitted is moved, whereby the mesh engagement between the gears which has been incomplete at the point of time whereat one of the gears in mesh engagement with each other has moved will become complete and therefore, no problem will arise.

Reference is now had to FIGS. 10 (A), (B) and (C) to describe a method of mounting and dismounting the cassette C with respect to the loading portion 63.

In these figures, reference characters 63a, 63b, 63c and 63d designate frame members forming the loading portion 63 and secured to the ink sheet frame 68. A convex spindle 63e is secured to the innermost one 63c of these frame members. Also, a knob 63g is provided on the frame member 63d, and a tapered spindle 63h is integrally provided on the knob 63q with the frame member 63d interposed therebetween and is movable in a direction perpendicular to the frame member 63d. A spring 63f is provided between the rear end 63h' of the spindle 63h and the frame member 63d, and this spring 63f biases the spindle 63h toward the core 55. Thus, if the operator grips the knob 63q and pulls out the knob 63q in the direction of arrow A against the resilient force of the spring 63f, the spindle 63h will also move in the direction of arrow A, and if the operator's hand is released from the knob 63g, the end surface 63q' of the knob 63q will come to bear against the frame member 63d with the aid of the resilient force of the spring 63f.

When the cassette C is to be mounted in the loading portion 63, the knob 63q is first pulled out in the direction of arror A, and then the cassette C is inserted into the loading portion 63 in a direction (the direction of arrow X in FIG. 8) perpendicular to the thrust direction. At that time, the cassette C is inserted into the loading portion 63 from the support shaft 52 side so that the recess 52b of the support shaft 52 fits to the spindle 63e, and the support shaft 52 is first caused to be held by the loading portion. Thereafter, the casette C is raised to a position in which the recess 53a of the support shaft 53 is opposed to the spindle 63h, and then the hand is released from the knob 63q. Thus, the knob 63q is returned in the direction of arror B by the spring force of the spring 63f and the spindle 63h fits into the recess 53.

Accordingly, the cassette C is mounted in the loading portion 63.

By selecting the magnitude of the resilient force of the spring 63f with the weight of the cassette C or the tension applied to the ink sheet being taken into account, the cassette C can maintain its state in which it is mounted in the loading portion 63 even if the body is in its opened state or even if tension is applied to the ink sheet 67 during the conveyance thereof to prevent the ink sheet from being wrinkled.

When the cassette C is to be removed from the loading portion 63, the knob 63q may be pulled out and the engagement between the spindle 63h and the recess 53a may be released, whereafter the engagement between the spindle 63e and the recess 52b may be released and the cassette C may be taken out in the direction of arrow Y (Fig. 9).

In the present embodiment, in addition to the effect possessed by the previous embodiment, the mounting and dismounting of the cassette C with respect to the loading portion 63 are effected in the directions (the directions of arrows X and Y) perpendicular to the thrust direction with the body being opened and therefore, it is not necessary to retract the recording head 73 during the mounting and dismounting of the cassette C and thus, the operability can be improved.

Figure 11:
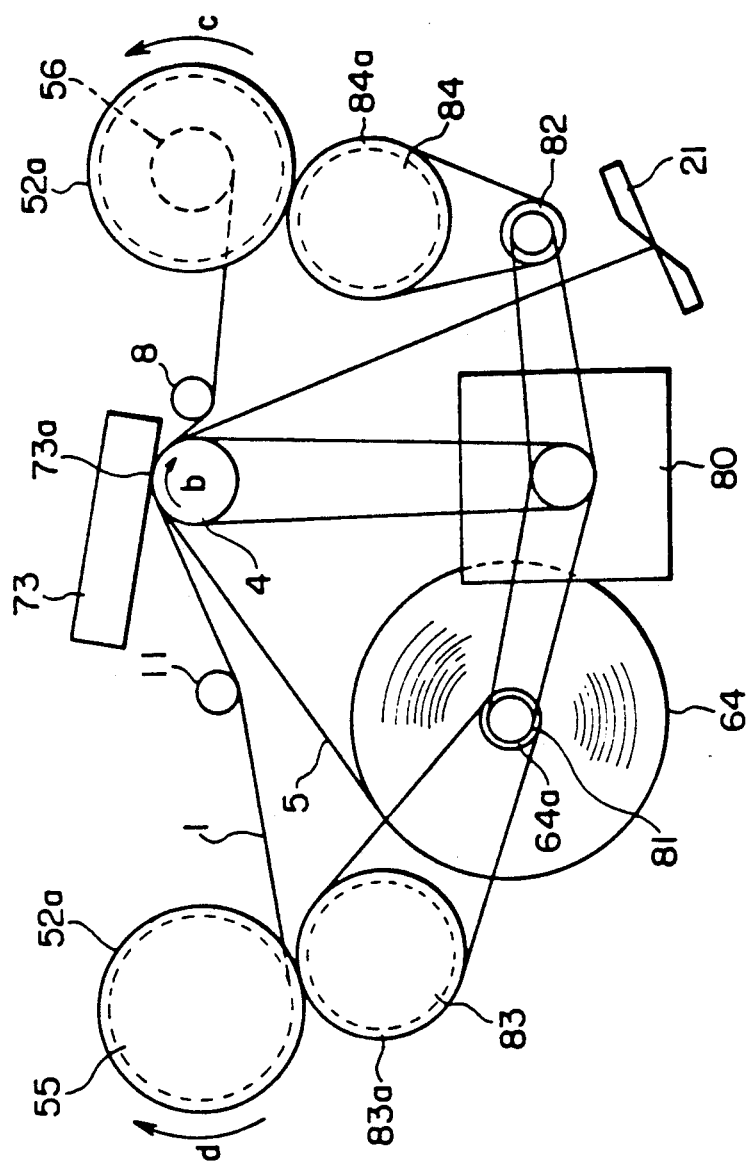
FIG. 11 is a schematic view of a driving system.

The driving of the ink sheet will now be described. FIG. 11 schematically shows the driving system.

In driving the above-described apparatus, the drive force to the platen roller 4 is transmitted by a motor 80 through a speed reduction system, and the drive forces supplied to the supply side core 55 and the take-up side core 56 are transmitted by the motor 80 through one-way clutches 81 and 82, respectively, and also through the speed reduction system and sliding clutches 83 and 84 which may slide when a predetermined load or more is applied thereto, by the mesh engagement between the gears of the sliding clutches and the suport shaft gear forced into the ink sheet roll.

The one-way clutch 81 connected to the supply side core 55 has such one-way directionality that it does not transmit the drive force of the motor 80 to the supply side core 55 when the motor 80 revolves in a direction for rotating the platen roller 4 in the direction of arrow b, i.e., a forward direction, and 1 such that it transmits the drive force to the supply side core 55 when the motor 80 revolves in a direction for rotating the platen roller 4 in the direction of −b (the minus sign indicates the direction opposite to the arrow), i.e., a reverse direction. The one-way clutch 82 connectd to the take-up side core 56 has such one-way directionality that it transmits the drive force of the motor 80 to the take-up side core 56 when the motor revolves in the forward direction and that it does not transmit the drive force to the take-up side core 56 when the motor revolves in the reverse direction.

Where the take-up speed of the ink sheet 1 by the supply side core 55 and the take-up side core 56 is set so as to be higher than the conveyance speed of the ink sheet 1 and the recording material 64 by the platen roller 4, that part of the former speed which exceeds the conveyance speed by the platen roller 4 is absorbed by the sliding of the sliding clutches 83 and 84 and a predetermined tension is applied to the ink sheet 1 by the sliding load of these sliding clutches. Accordingly, the diameter of the roll taken up by the take-up of the ink sheet 1 varies and the variation in the take-up speed arising therefrom can be absorbed.

When recording is started, the motor 80 revolves in the direction of arrow a, i.e., the forward direction, whereby the platen roller 4 is rotated in the direction of arrow b and the ink sheet 1 and the recording material 64 are conveyed forwardly and a predetermined image is recorded on the recording material 64 by the heat-generating member 73a of the thermal head 73. At this time, the drive of the supply side core 55 is cut off by the one-way clutch 81 and the ink sheet 1 is supplied with a predetermined back tension being applied thereto by the sliding clutch 83, and a drive force in the direction of arrow c is transmitted to the take-up side core 56 through the one-way clutch 82, whereby the ink sheet 1 being conveyed is taken up by the take-up side core 56. At this time, the take-up speed by the take-up side core 56 is set to a value higher than the conveyance speed by the platen roller 4, whereby sliding occurs to the sliding clutch 84 and by this sliding, front tension is applied to the ink sheet 1. Thus, no slack occurs in the ink sheet 1.

When a sheet of recording is terminated, the recording material 64 is conveyed until the trailing end edge of the recorded image passes the cutting position of the cutters 21, and also the ink sheet 1 is taken up by the take-up side core 56 at the same speed.

After the recording material 64 is cut from the trailing end edge of the recorded sheet, the motor 80 revolves in the direction −a, i.e., the reverse direction, and the drive force thereof is transmitted to the platen roller 4, which is thus rotated in the direction −b and the recording material 64 is rewound so that the cut end of the recording material 64 comes to the vicinity of the heat-generating member 73a. This is for the purpose of eliminating the blank portion at the leading end of the recording material 64 during the next recording because, in the position wherein the recording material 64 has been cut, nothing is recorded on the portion thereof from the cut end to the heat-generating member 73a. When the motor 30 revolves in the reverse direction, the drive force to the take-up side core 56 is cut off by the one-way clutch 82 and the drive force of the motor 80 is transmitted to the supply side core 55 through the one-way clutch 81 and the supply side core 55 is rotated in the direction of arrow d and therefore, the ink sheet 1 is also taken up by the supply side core 55 at the same speed as that of the recording material 64 being rewound. The design such that at this time, as when the motor 80 revolves in the forward direction, back tension and front tension are applied to the ink sheet 1 by the sliding of the respective sliding clutches 83 and 84 to prevent any slack from occurring in the ink sheet 1.

A further embodiment of the ink sheet cassette will now be described.

Figure 12:
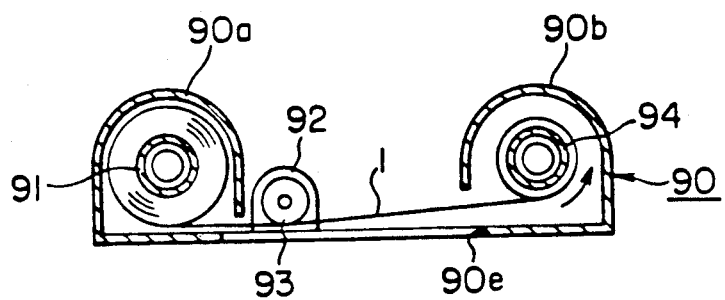
FIGS. 12 to 14 illustrate another embodiment of the cassette, FIG. 12 being a longitudinal cross-sectional side view, FIG. 13 being a front view of a tension roller, and FIG. 14 being a perspective view of the cassette.
Figure 13:
Figure 14:
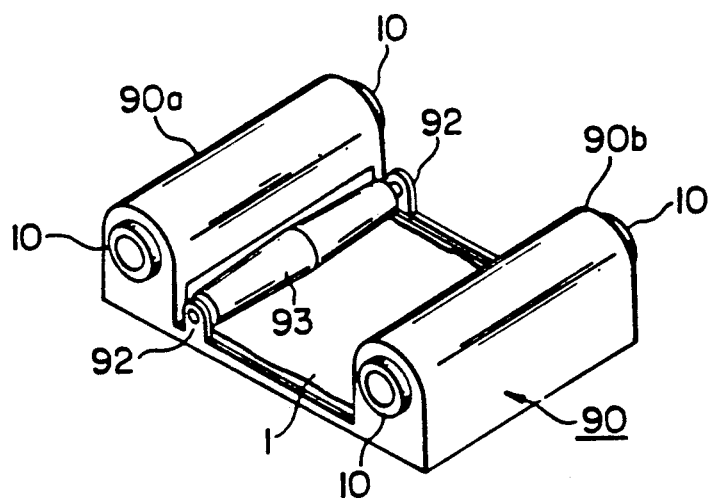
Figure 15:
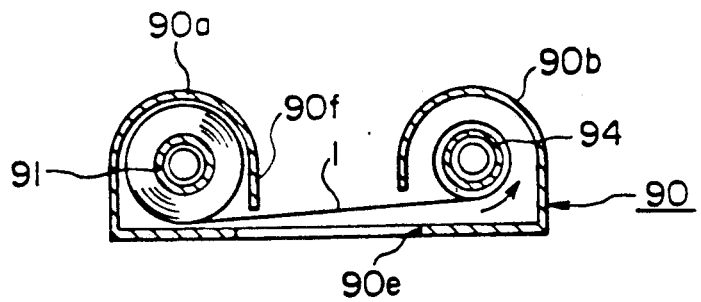
FIGS. 15 to 18 illustrate still another embodiment of the cassette, FIG. 15 being a longitudinal cross-sectional front view of the cassette, FIG. 16 being a longitudinal cross-sectional side view thereof, FIG. 17 being an enlarged view of a portion of the cassette, and FIG. 18 being a perspective view of the cassette.

FIGS. 12 to 14 illustrate another embodiment.

In this embodiment, a pair of left and right support plates 92 are provided near a bulged portion 90a in which the core 91 of the cassette 90 is contained, and a tension roller 93 which is slack eliminating means is rotatably journalled between the pair of support plates 92. Designated by 90e is an opening, and denoted by 94 is a take-up shaft.

The tension roller 93 is such that as shown in FIG. 13, the lengthwisely central portion thereof provides a large-diametered portion and the diameter thereof becomes gradually smaller toward its opposite ends.

If such a tension roller 93 is provided, the ink sheet 1 when directed out comes into contact with the underside of the tension roller 93 and components of tensile force directed toward the left and right of the widthwise direction are imparted to the ink sheet 1, whereby any slack in the ink sheet 1 is eliminated and no wrinkle is created in the ink sheet.

The ink sheet 1 is unwound from the core 91 and this core 91 is rotated counter-clockwise as viewed in FIG. 12, and if, at this time, a clockwise damping force acts on the core 91 due to friction force or spring force, tension will be applied to the ink sheet lying between the core 91 and the recording station and the component of tensile force directed in the widthwise direction of the ink sheet will become great to thereby further increase the wrinkle preventing effect.

FIGS. 15 to 18 illustrate still another embodiment. In this embodiment, a structure utilizing the side wall of a bulged portion 90a is adopted as slack eliminating means.

Figure 16:
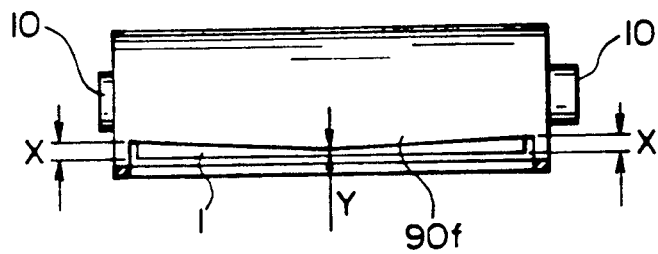

That is, the lower end portion of the inner side wall of the bulged portion 90a in which a core 91 is contained, namely, the side wall 90f which is adjacent to the bulged portion 90b, is lowest at its center and highest at its opposite ends, as shown in FIG. 16.

That is, when the distance between the central portion of the side wall 90f and the ink sheet 1 is Y and the distance between each of the opposite ends of the side wall 90f and the ink sheet 1 is X, this embodiment is constructed so that $X > Y$. Thus, as in the case of the previously described tension roller 93, a component of tensile force is imparted in the widthwise direction so that the side wall adjacent to the outlet for the ink sheet 1 is mountain-shaped toward the lower portion, whereby any slack can be eliminated and wrinkles can be prevented from being created.

Figure 17:
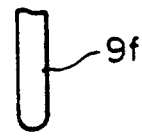
Figure 18:
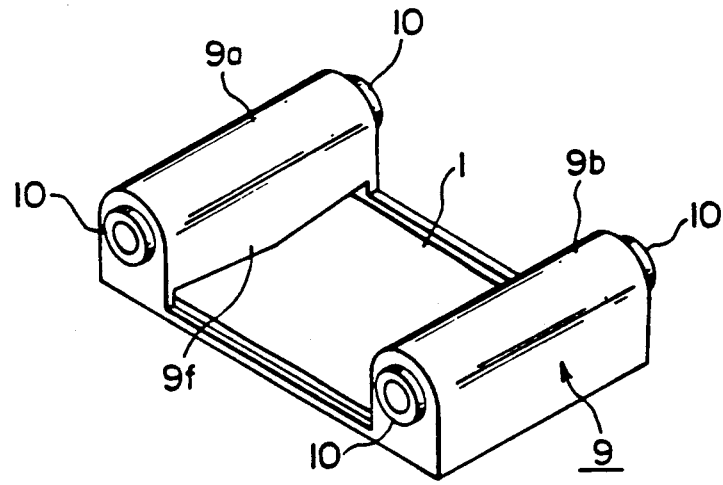

The lower end edge of the side wall 90f, as is enlargedly shown in FIG. 17, is of arcuate cross-section so that the ink sheet 1 may not be caught thereby.

Also, if, as in the case of the previous embodiment, a damping force in the direction opposite to the direction in which the ink sheet is drawn out is imparted to the core 91 side, tension will be applied to the ink sheet and a component of tensile force directed in the widthwise direction will be provided, whereby at the recording station, creation of wrinkles in the ink sheet can be prevented more reliably.

Figure 19:
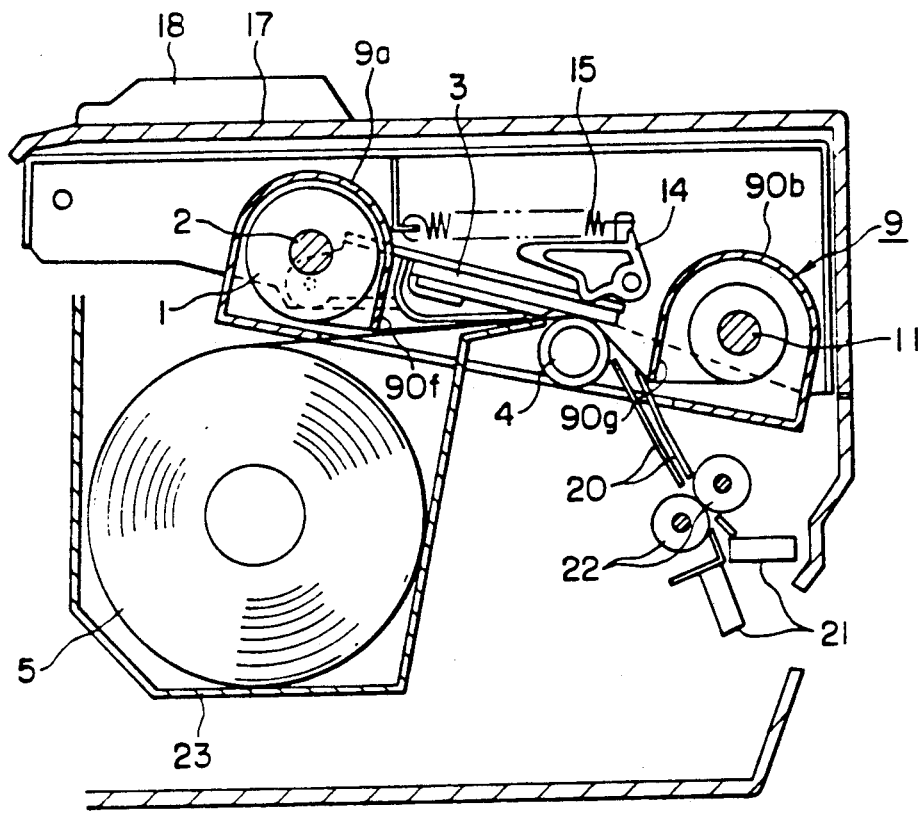
FIG. 19 is a longitudinal cross-sectional view illustrating yet another embodiment of the cassette.

FIG. 19 illustrates yet another embodiment. In this embodiment, a structure which is mountain-shaped toward the lower portion like the side wall 90f is also adopted for the side wall 90g of the bulged portion 90b.

The adoption of such a structure can prevent the creation of wrinkles in the ink sheet during the reversal thereof.

That is, after recording has been terminated and the cutting of the recording paper has been effected, the leading end of the recording paper remaining in the apparatus is returned to the vicinity of the recording station to reduce the blank portion at the leading end of the recording paper, and at this time, it is necessary to rotate the platen roller 4 in the reverse direction and thereby return the ink sheet and the recording paper by a predetermined distance, and at this time, the mountain-shaped side wall 90g can prevent creation of wrinkles.

In the conventional apparatus, when the recording paper is to be returned, the thermal head or the platen roller has been caused to escape to thereby eliminate the state in which the recording paper and the ink sheet are held between the thermal head and the platen roller, and only the recording paper has been returned.

Figure 20:
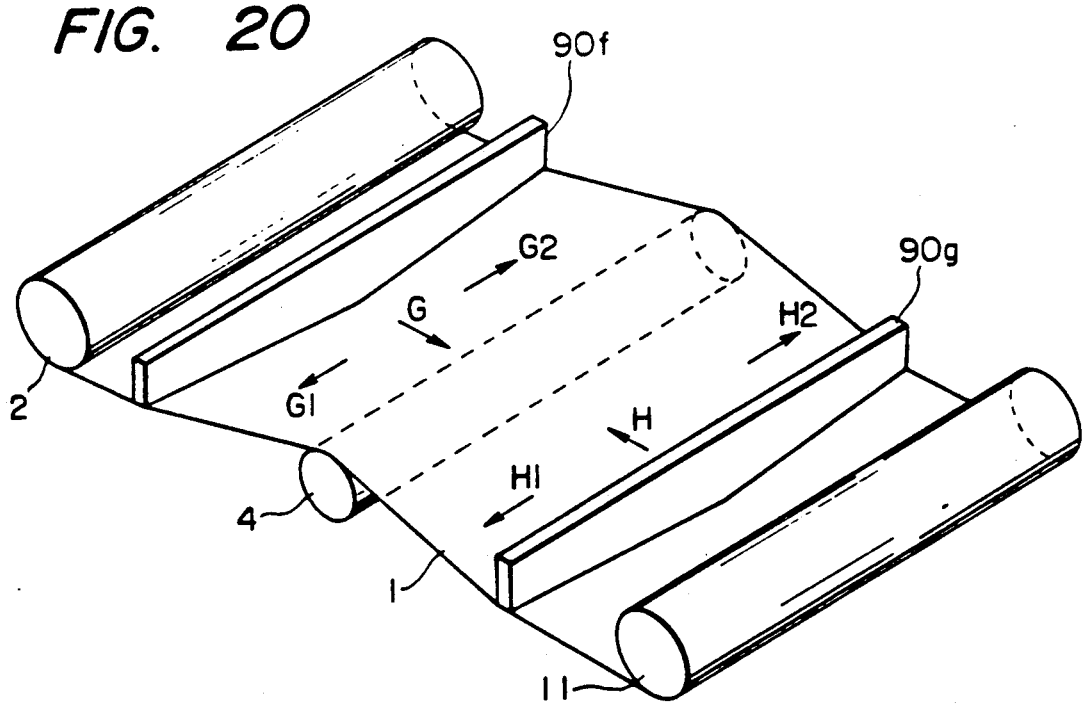
FIG. 20 is a perspective view for illustrating the wrinkle preventing effect.

FIG. 20 illustrates the wrinkle preventing effect. When the ink sheet 1 is drawn in the direction of arrow G during forward revolution, a tensile force is applied in the directions of arrows G1 and G2 by the mountain-shaped end edge of the side wall 90f, and when the ink sheet 1 is drawn in the direction of arrow H during reverse revolution, a tensile force in the directions of arrows H1 and H2 is applied to the ink sheet 1 by the side wall 90g, whereby creation of wrinkles can be prevented.

Figure 21:
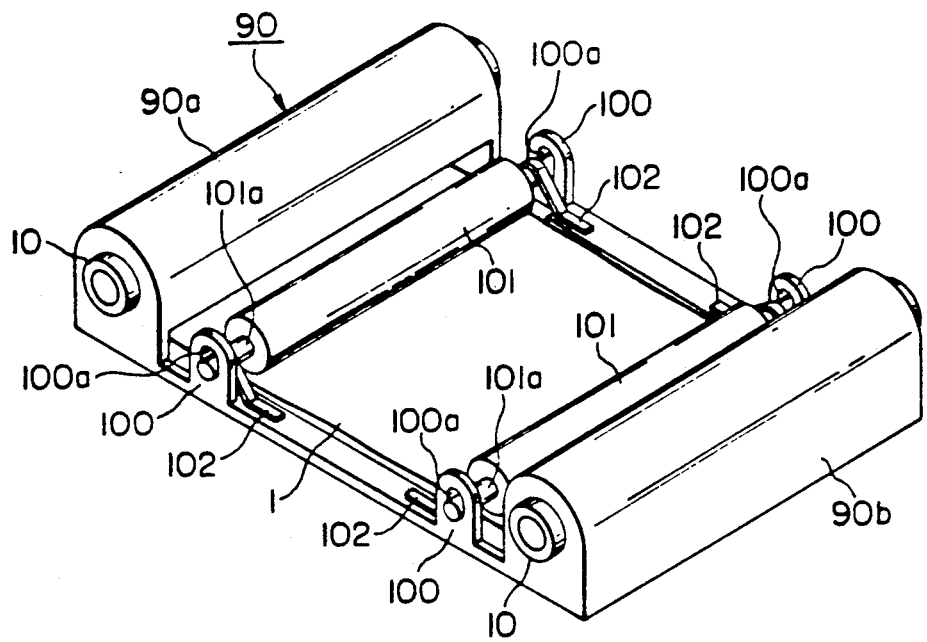
FIG. 21 is a perspective view of a further embodiment of the cassette.

A further embodiment is shown in FIG. 21. In this embodiment, a set of support plates 100, 100 are projectedly provided in opposed relationship with each other near each of the bulged portions 90a and 90b of a cassette 90, and a slot 100a is formed in each of these support plates 100 along the axial direction.

These slots 100a are utilized to rotatably journal the opposite ends of each tension roller 101.

The length of the large-diametered portion of the tension roller 101 is greater than the length of the ink sheet 1.

Reference numeral 102 designates plate springs. One end of each of the plate springs 102 is fixed to the cassette 90 side and the free end thereof is in contact with the upper side of the small-diametered portion 101a at each end of the tension roller 101.

Accordingly, the tension roller 101 is normally biased downwardly by the resilient force of the plate spring 102.

When the cassette 90 having the above-described structure is mounted on the original carriage cover 17 side and the original carriage cover 17 is closed, the platen roller fits into the opening 90e in the cassette 90 and urges the recording sheet 67 and the ink sheet 1 against the thermal head 73.

At this time, the recording sheet 67 and the ink sheet 1 are bent into the form of a mountain toward the thermal head 73 side, and the tension rollers 101, 101 are urged upwardly against the thermal head 73 against the repulsion forces of the plate springs 102.

As a result, the slack of the ink sheet 1 is eliminated and creation of wrinkles is prevented.

The tension of the ink sheet between the tension rollers 101 and the platen roller 4 suffers from no sharp variation because the tension rollers move up and down while being pushed by the plate springs 102.

Figure 22:
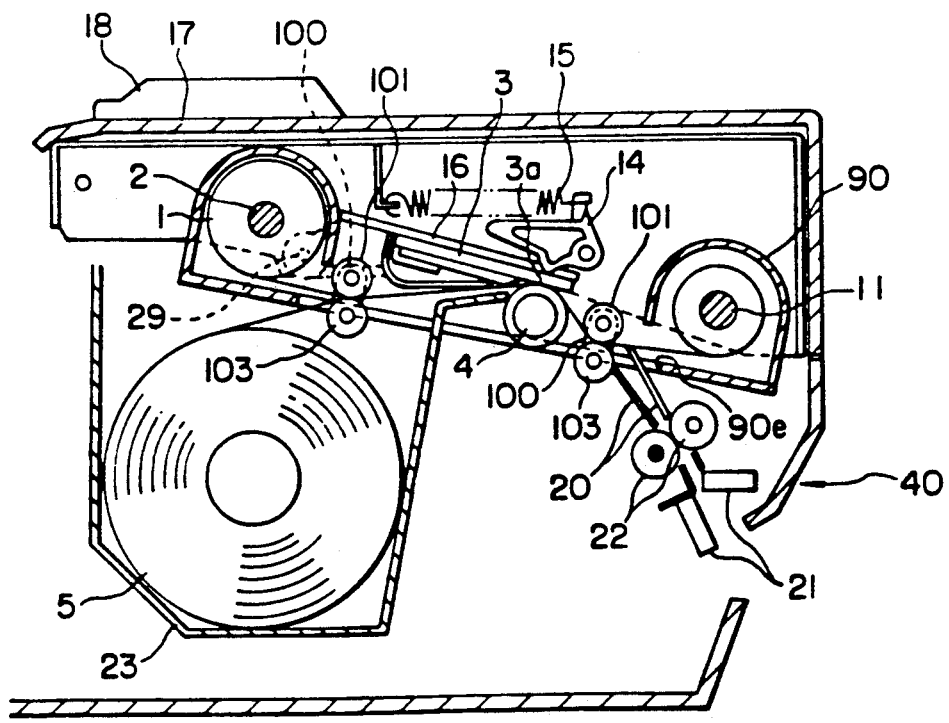
FIG. 22 is a cross-sectional view of the apparatus loaded with a cassette.

FIG. 22 shows still a further embodiment. In this embodiment, rollers 103 are provided not only on the cassette 90 side but also on the apparatus body side.

These rollers 103 are constructed as feed rollers and are rotated by a drive source, not shown, on the apparatus body side, and when the original carriage cover 17 is closed, the rollers 103 fit into the interior through the opening 90e in the cassette 90 and come into contact with the respective tension rollers 101, thereby holding the recording sheet 67 and the ink sheet 1 therebetween.

Where such a structure is adopted, the ink sheet 1 together with the recording sheet 67 is nipped by and between the tension roller 101 and the feed rollers 103 during recording, and a conveying force, is imparted thereon by the driving of the feed rollers 103, and sheet is fed while the slack of the ink sheet is being eliminated.

The adoption of such a structure may also result in an effect similar to that of the previously described embodiment.

As the ink sheet used in the present embodiment, mention may be made, for example, of a plastic transfer film with heat-meltable ink applied thereto. This ink sheet is such that when it is heated with the recording sheet superposed thereon by a heat-generating member operated in response to an information signal, the ink or the film is melted and the ink of that portion remains on the transfer sheet (recording sheet), thereby forming a print. The holding member for holding the recording sheet conveyed by conveyor means is not limited to the platen roller, but may be any member such as a planar or arcuate member capable of holding the sheet.

I claim:

1. An ink sheet cassette mountable to a recording apparatus, comprising:
   a frame member;
   an ink sheet having ink;
   a first winding member for winding said ink sheet;
   a second winding member for winding said ink sheet;
   a first support member for supporting said first winding member on said frame member and contacting a first member on said recording apparatus when said ink sheet cassette is mounted on said recording apparatus; and
   a second support member for supporting said first winding member on said frame member and contacting a second member on said recording apparatus when said ink sheet cassette is mounted on said recording apparatus, wherein said first and second support members each have a member for rotatably attaching a roll of said ink sheet to said frame member.

2. An ink sheet cassette according to claim 1, wherein said first and second winding members each have a core.

3. An ink sheet cassette according to claim 1, further comprising a recording apparatus having recording means including a thermal head having a plurality of heat generating elements.

4. A recording apparatus for recording an image on a recording medium, comprising:

a mounting section, including first and second contacting members, for detachably mounting an ink sheet cassette having, a frame member, an ink sheet having ink, a first winding member for winding said ink sheet, a second winding member for winding said ink sheet, a first support member for supporting said first winding member on said frame member having a first contacting section for contacting said first contacting member on said recording apparatus when said ink sheet cassette is mounted on said recording apparatus, and a second support member for supporting said first winding member on said frame member having a second contacting section for contacting said second contacting member on said recording apparatus when said ink sheet cassette is mounted on said recording apparatus, wherein said first and second support members each have a member for rotatably attaching a roll of said ink sheet to said frame member;

recording means for recording the image on the recording medium using the ink sheet of the ink sheet cassette mounted on said mounting section ; and conveying means for conveying said recording medium.

5. A recording apparatus according to claim 4, wherein said first and second winding members each have a core.

6. A recording apparatus according to claim 4, wherein said recording means has a thermal head having a plurality of heat generating elements.

7. A recording apparatus according to claim 4, wherein said first and second contacting members each have a spindle having a projecting-shape.

* * * * *

UNITED STATES PATENT AND TRADEMARK OFFICE
CERTIFICATE OF CORRECTION

PATENT NO. : 5,128,763
DATED : July 7, 1992
INVENTOR(S) : KENKICHI SAKURAGI

It is certified that error appears in the above-identified patent and that said Letters Patent is hereby corrected as shown below:

COLUMN 1

Line 22, "corsing" should read --carrying--.

COLUMN 2

Line 22, "such as repair, to be accomplished" should read --of such a repair--.

COLUMN 3

Line 28, "lengthwisely" should read --lengthwise--.
Line 33, "wisely" should read --wise--.

COLUMN 4

Line 37, "35." should read --35b.--.

COLUMN 5

Line 48, "an" should read --can--.

COLUMN 7

Line 11, "transfereed" should read --transferred--.
Line 18, "discharge" should read --discharged--.
Line 19, "discharges" should read --discharge--.

UNITED STATES PATENT AND TRADEMARK OFFICE
CERTIFICATE OF CORRECTION

PATENT NO. : 5,128,763

DATED : July 7, 1992

INVENTOR(S) : KENKICHI SAKURAGI

It is certified that error appears in the above-identified patent and that said Letters Patent is hereby corrected as shown below:

COLUMN 8

Line 11, "52a" should read --53a--.
Line 24, "figures ," should read --figures,--.
Line 57, "cassestte" should read --cassette--.
Line 65, "the" should read --and--.

COLUMN 9

Line 2, "heat" should read --head--.
Line 32, "cassette c" should read --cassette C--.

COLUMN 10

Line 13, "knob 63q" should read --knob 63g--.
Line 15, "member 63d ." should read --member 63d.--.
Line 19, "knob 63q" should read --knob 63g--.
Line 20, "63q" should read --63g--.
Line 23, "surface 63q' " should read --surface 63g'--.
Line 24, "knob 63q" should read --knob 63g--.
Line 27, "knob 63q" should read --knob 63g--.
Line 28, "arror" should read --arrow--.
Line 38, "knob 63q" (both occurrences) should read --knob 63g--.
Line 39, "arror" should read --arrow--.
Line 40, "recess 53." should read --recess 53a.--.
Line 52, "knob 63q" should read --knob 63g--.

COLUMN 11

Line 17, "1" should be deleted.
Line 21, "arrow) ," should read --arrow),--.
Line 22, "direction ." should read --direction.-- and "connectd" should read --connected--.

UNITED STATES PATENT AND TRADEMARK OFFICE
CERTIFICATE OF CORRECTION

PATENT NO. : 5,128,763
DATED : July 7, 1992
INVENTOR(S) : KENKICHI SAKURAGI

It is certified that error appears in the above-identified patent and that said Letters Patent is hereby corrected as shown below:

COLUMN 12

Line 35, "lengthwisely" should read --lengthwise--.
Line 67, "Thus," should read --¶ Thus,--.

Signed and Sealed this

Thirteenth Day of September, 1994

Attest:

BRUCE LEHMAN

Attesting Officer      Commissioner of Patents and Trademarks